US005373279A

United States Patent [19]

Ozawa et al.

[11] Patent Number: 5,373,279

[45] Date of Patent: Dec. 13, 1994

[54] ARRESTER FOR GAS INSULATED SWITCHGEAR DEVICE

[75] Inventors: Jun Ozawa; Katsuji Shindo, both of Hitachi; Kazuya Ooishi, Naka; Yoshitaka Yagihashi, Hitachi, all of Japan

[73] Assignee: Hitachi, Ltd., Tokyo, Japan

[21] Appl. No.: 140,557

[22] Filed: Oct. 25, 1993

[30] Foreign Application Priority Data

Oct. 29, 1992 [JP] Japan .................................. 4-291546

[51] Int. Cl.[5] .......................... H01C 7/10; H02H 3/22
[52] U.S. Cl. ...................................... 338/21; 361/127
[58] Field of Search .................... 338/20, 21; 361/127, 361/120, 126, 117

[56] References Cited

U.S. PATENT DOCUMENTS 4,321,651 3/1982 Ozawa et al. .
4,340,924 7/1982 Kresge et al. .
4,404,614 9/1983 Koch et al. ...................... 361/117 X
4,930,039 5/1990 Woodworth et al. .............. 361/127

FOREIGN PATENT DOCUMENTS 53-101233 11/1978 Japan .
57-100704 6/1982 Japan .
64-1913 1/1989 Japan .

*Primary Examiner*—Marvin M. Lateef
*Attorney, Agent, or Firm*—Fay, Sharpe, Beall, Fagan, Minnich & McKee

[57] ABSTRACT

An arrester for a gas insulated switchgear device includes a closed container filled with an insulating gas; a columnar piled body formed by piling up a plurality of zinc oxide resistance elements between a high voltage side terminal and a grounding side terminal disposed in the closed container; a plurality of potential equalizing rings electrically and mechanically connected to the high voltage side terminal of the columnar piled body, the potential equalizing rings being disposed in a discrete manner along the piling up direction of the zinc oxide resistance elements with a predetermined spacing distance while surrounding the outer circumference of the columnar piled body; and an intermediate electrode disposed around the columnar piled body at a position facing the potential equalizing ring located nearest to the grounding side terminal among the potential equalizing rings.

8 Claims, 5 Drawing Sheets

ARRESTER FOR GAS INSULATED SWITCHGEAR DEVICE

BACKGROUND OF THE INVENTION

1. Field of the Invention

The present invention relates to an arrester for a gas insulated switchgear device and, in particular, relates to an arrester for a gas insulated switchgear device in which a plurality of zinc oxide resistance elements are piled up to constitute a columnar piled body and a plurality of equalizing rings are disposed around the columnar piled body in a discrete manner and in the piling direction.

2. Description of Related Art

An arrester for a gas insulated switchgear device is constituted by disposing a columnar piled body formed by piling up a plurality of zinc oxide resistance elements in a metallic closed container filled with an electrically insulating gas. In such structure, it is generally known that a division rate of an applied voltage to the respective zinc oxide resistance elements forming the columnar piled body along the piling direction is non-uniform due to stray capacitances between the columnar piled body and the closed contaiiner.

A conventional arrester for a gas insulated switchgear device which improves the above problem is disclosed in JP-B-64-1913, which corresponds to U.S. Pat. No. 4,340,924 and is illustrated in FIG. 9. Namely, a metallic closed container 2 filled with an electrically insulating gas is connected to a non-illustrated gas insulated switchgear device via an insulating spacer 3, and in the closed container 2 a columnar piled body 1 is disposed, the lower end of which is grounded and the upper end of which is connected to a main circuit conductor. The columnar piled body 1 is formed by piling up a plurality of zinc oxide resistance elements in the axial direction of the closed container 2.

At the side of the main circuit conductor 4 on the columnar piled body 1, an umbrella shaped shield member 26 is provided. At the lower end of the umbrella shaped shield member 26, a potential equalizing ring 20, such as a shield ring surrounding the outer circumference of the columnar piled body 1, is fixed. Further, a plurality of potential equalizing rings 21 and 22, arranged in the pile axis direction of the zinc oxide resistance elements with a predetermined spacing distance and similarly surrounding the outer circumference of the columnar piled body 1, are disposed, and these potential equalizing rings 20, 21 and 22 are electrically and mechanically connected to the side of the main circuit conductor 4 via conductors 30 and 31. The distances between the respective potential equalizing rings 20, 21 and 22 are determined in such a manner that equipotential lines passing between the respective potential equalizing rings 20, 21 and 22 are to be connected to the corresponding equipotential planes on the columnar piled body 1 as illustrated by dotted lines, whereby the division rate of applied voltage on the respective zinc oxide resistance elements of the columnar piled body 1 is made uniform throughout the entire piling up direction.

With the modified conventional arrester for a gas insulated switchgear device, through the above mentioned provision of the respective potential equalizing rings 20, 21 and 22, the division rate of the applied voltage on the respective zinc oxide resistance elements of the columnar piled body 1 is remarkably improved throughout the entire piling up direction. However, according to an analysis by the present inventors, when the length of the columnar piled body 1 increases in comparison with the diameter of the closed container 2, it was found out that among the respective potential equalizing rings 20, 21 and 22, the electric field most concentrates at the lower side of the lowermost potential equalizing ring 22, namely the ring located near the grounding potential side, and a division rate of an applied voltage on the zinc oxide resistance element of the columnar piled body 1 facing the lowermost potential equalizing ring 22 located near the grounding potential side becomes higher than those of the zinc oxide resistance elements in the other locations.

SUMMARY OF THE INVENTION

An object of the present invention is to provide an arrester for a gas insulated switchgear device in which the division rate of the respective zinc oxide resistance elements forming a columnar piled body is made uniform throughout the entire piling direction thereof.

For achieving the above object, an arrester for a gas insulated switchgear device, in which a columnar piled body formed by piling up a plurality of zinc oxide resistance elements between a high voltage side terminal and a grounding side terminal is disposed in a closed container filled with an insulating gas, and a plurality of potential equalizing rings are also disposed which are arranged along the piling direction of the zinc oxide resistance elements with a predetermined spacing distance in a discrete manner so as to surround the outer circumference of the columnar piled body and are connected electrically and mechanically to the high voltage side terminal of the columnar piled body, is characterized in that the portion of the columnar piled body facing the lowermost potential equalizing ring located nearest to the grounding side terminal is provided with an intermediate electrode.

Since the arrester for a gas insulated switchgear device according to the present invention is provided with the intermediate electrode at the portion around the columnar piled body facing the lowermost potential equalizing ring located nearest to the grounding side terminal, the electric field at the lower portion of the potential equalizing ring located nearest to the grounding side terminal is controlled and relaxed by the intermediate electrode facing thereto, and thereby a division rate of the applied voltage on the respective zinc oxide resistance elements forming the columnar piled body is made uniform throughout the entire piling up direction thereof in comparison with the conventional arresters for a gas insulated switchgear device.

DETAILED DESCRIPTION OF THE EMBODIMENTS

Hereinbelow, embodiments according to the present invention are explained with reference to the drawings.

Figure 1:
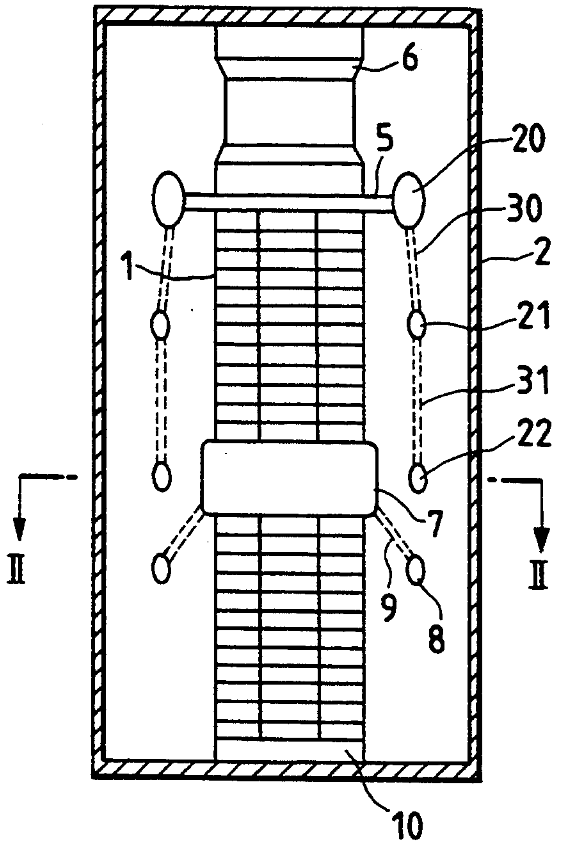
FIG. 1 is a vertical cross sectional view of one embodiment of an arrester for a gas insulated switchgear device according to the present invention.

FIG. 1 is a vertical cross sectional view of one embodiment of an arrester for a gas insulated switchgear device according to the present invention. Inside a closed container 2 filled with an insulating gas is disposed a columnar piled body 1 constituted by four columnar piled body units 1*a*, 1*b*, 1*c* and 1*d* (see FIG. 2) arranged in parallel, the upper end of which is connected to a high voltage side terminal 5 leading to a main circuit conductor, and the lower end of which is connected to a grounding side terminal 10. The high voltage side terminal 5 is supported and secured to an inner wall face of the closed container 2 via an insulating supporting member 6 and is connected to a gas insulated switchgear device via a main circuit conductor led out from a non-illustrated branching portion. Alternatively, the high voltage side terminal 5 can be connected to the gas insulated switchgear device via a conductor extending from a potential equalizing ring 22.

Figure 2:
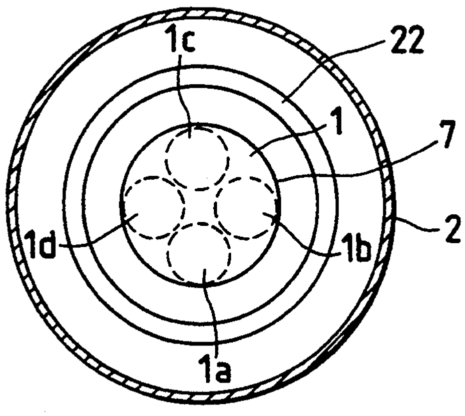
FIG. 2 is a cross sectional view taken along the line II—II in FIG. 1.

The respective columnar piled body units 1*a* through 1*d* are formed by piling up a plurality of zinc oxide resistance elements in the axial direction of the closed container 2 and are arranged so as to be located at the respective apices of an imaginary square as shown in FIG. 2, which is a cross sectional view taken along the line II—II in FIG. 1. At the outer circumference of the high voltage side terminal 5 is a potential equalizing ring 20 constituted by, for example a shield ring surrounding the outer circumference of the thus-constituted columnar piled body 1. Further, a plurality of potential equalizing rings 21 and 22 arranged in the pile axis direction of the zinc oxide resistance elements with a predetermined spacing distance and similarly surrounding the outer circumference of the columnar piled body 1 are disposed, and these potential equalizing rings 20, 21 and 22 are electrically and mechanically connected to the high voltage side terminal 5 via conductors 30 and 31. The distances between the respective potential equalizing rings 20, 21 and 22 are determined in such a manner that respective equipotential lines pass between the respective potential equalizing rings 20, 21 and 22, and these equipotential lines are to be connected to the corresponding equipotential planes on the columnar piled body 1. In order to keep the above condition, the conductors 30 and 31 are formed in a plate having a narrow width and arranged, for example, around the outer circumference of the columnar piled body 1 in a discrete manner so as not to completely shield the space between the respective potential equalizing rings 20, 21 and 22.

Further, at the position facing the potential equalizing ring 22, an intermediate electrode 7 is secured around the columnar piled body 1 and the width of the intermediate electrode 7 in the piling up direction of the zinc oxide resistance elements is selected to be larger than that of the potential equalizing ring 22 in the same direction. Still further, another potential equalizing ring 8 which surrounds the outer circumference of the columnar piled body 1 located below the intermediate electrode 7 is disposed, and is electrically and mechanically connected to the intermediate electrode 7 via a conductor 9. The distance between the intermediate electrode 7 and the potential equalizing ring 8 is so selected that equipotential lines pass therebetween and continue to the corresponding equipotential planes on the columnar piled body 1. In order to keep the above condition, the conductor 9 is similarly formed in a plate having a narrow width and arranged, for example, around the outer circumference of the columnar piled body 1 in a discrete manner so as not to completely shield the space between the respective potential equalizing rings 20, 21 and 22.

Further, although in the present embodiment a single potential equalizing ring 8 is secured to the intermediate electrode 7, a plurality of potential equalizing rings can be provided in the same manner as at the high voltage side terminal 5.

Figure 3:
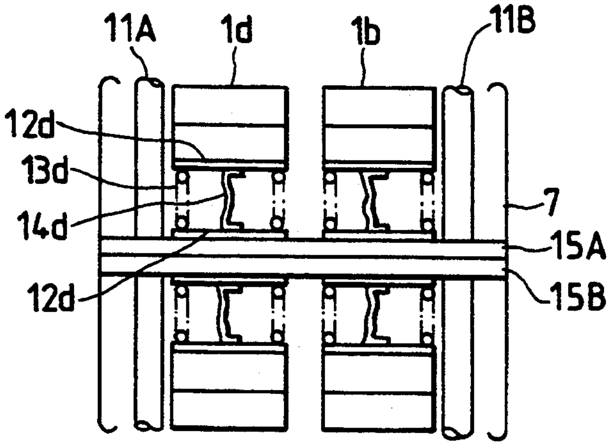
FIG. 3 is an enlarged cross sectional view of a major portion of the arrester for a gas insulated switchgear device as shown in FIG. 1.

FIG. 3 is a cross sectional view enlarging the supporting structure of the intermediate electrode 7 as shown in FIG. 1.

The columnar piled body unit 1*d* is, for example, formed by piling up a plurality of zinc oxide resistance elements and, at a mid-portion thereof, plate-like connecting members 15A and 15B are interposed therebetween. Above and below these connecting members 15A and 15B, a pair of electrode plates 12*d* are disposed. Between the electrode plates 12*d* forming the pair, a spring 13*d* and a connecting wire 14*d* electrically connecting the paired electrode plates 12*d* are respectively provided. The thus assembled columnar pile body units 1*a* through 1*d* are respectively clamped between both terminals 5 and 10 in the axial direction by making use of a plurality of insulating rods 11A and 11B, whereby the springs 13*d* are pretensioned by compressing to induce a contacting pressure between the respective zinc oxide resistance elements. The outer circumferences of the connecting members 15A and 15B interposed in the piling mid-portion of the plurality of the zinc oxide resistance elements are projected beyond the outer circumference of the columnar piled body 1 while avoiding the insulating rods 11A and 11B, and then the intermediate electrode 7 is supported and secured by this projecting outer circumference portion. Accordingly, a potential at the intermediate portion of the piled zinc oxide resistance elements is applied to the intermediate electrode 7.

Figure 9:
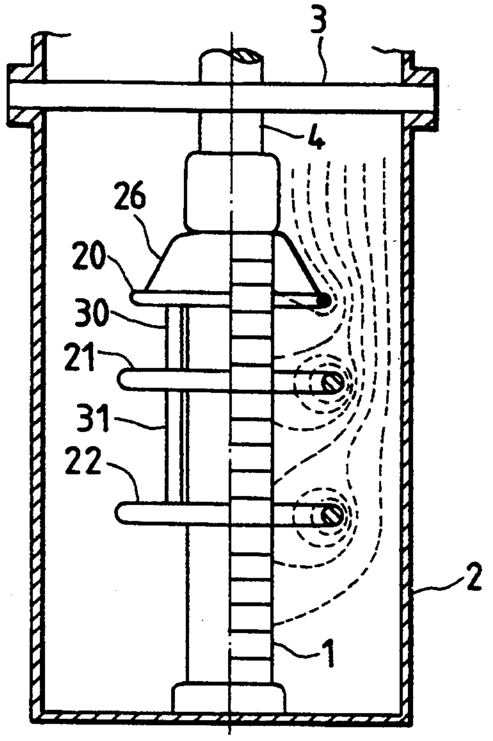
FIG. 9 PRIOR ART
FIG. 9 is a vertical cross sectional view of a conventional arrester for a gas insulated switchgear device.

Since the plurality of potential equalizing rings 20, 21 and 22 surrounding the outer circumference of the columnar piled body 1 are arranged in the piling up direction of the zinc oxide resistance elements with a predetermined spacing distance in a discrete manner. Further, the distances between the respective potential equalizing rings 20, 21 and 22 are selected in such a manner that respective equipotential lines pass between the respective potential equalizing rings 20, 21 and 22 and these equipotential lines are to be continuously connected to the corresponding equipotential planes on the columnar piled body 1, and moreover, the intermediate electrode 7 facing the potential equalizing ring 22 located nearest to the grouding side among the respective potential equalizing rings 20, 21 and 22 is provided as explained above. The division rate of the applied voltage on the respective zinc oxide resistance elements along the piling up direction of the columnar piled body 1 is made further uniform in comparison with the conventional one as illustrated in FIG. 9. In contrast to the conventional arrester in which an electric field concentration is caused at the lower end portion of the potential equalizing ring 22, to increase the applied voltage division rate at the portion of the zinc oxide resistance element facing the potential equalizing ring 22, the improvement is achieved due to the provision of the intermediate electrode 7 facing the potential equalizing ring 22 which shifts an equipotential line in the piling up direction along the surface thereof to improve the electric field distribution therearound. Because of the above provision the applied voltage division rate improving effect due to the respective potential equalizing rings 20, 21 and 22 disposed discretely is synergetically increased and the applied voltage division rate of the respective zinc oxide resistance elements in the piling up direction of the columnar piled body 1 is made further uniform.

Further, for the newly introduced intermediate electrode 7, an assembly known as a cylindrical shield for electric field relaxation constituted by a thin conducting plate can be used, as a result the production cost increase of the arrester for a gas insulated switchgear device is suppressed.

Still further, since the intermediate electrode 7 is provided so as to surround the connecting members 15A and 15B which electrically connect adjacent divided portions of the columnar piled body 1 which is to be divided into at least two portions in its piling up direction as illustrated in FIG. 3, the intermediate electrode 7 operates to improve the electric field concentration at the lower part of the potential equalizing ring 22, and to serve for relaxing electric field concentration at the connecting portion formed by the connecting members 15A and 15B, whereby the structure of the connecting members 15A and 15B is simplified.

Moreover, since the potential equalizing ring 8 which surrounds the outer circumference of the portion of the columnar piled body 1 located below the intermediate electrode 7 is provided and the distance between the potential equalizing ring 8 and the intermediate electrode 7 is selected in such a manner that equipotential lines therebetween as well as these equipotential lines continue to the corresponding equipotential planes on the columnar piled body 1, and further the potential of the potential equalizing ring 8 is equivalent to that at the intermediate electrode 7, and electrical insulation between the potential equalizing ring 8 and the closed container 2 and the grounding side terminal 10 is easily provided in comparison with a possible provision of a potential equalizing ring electrically connected to the high voltage side terminal 5 via the potential equalizing ring 22 located therebelow, accordingly, control of the equipotential lines is further effectively performed.

Figure 4:
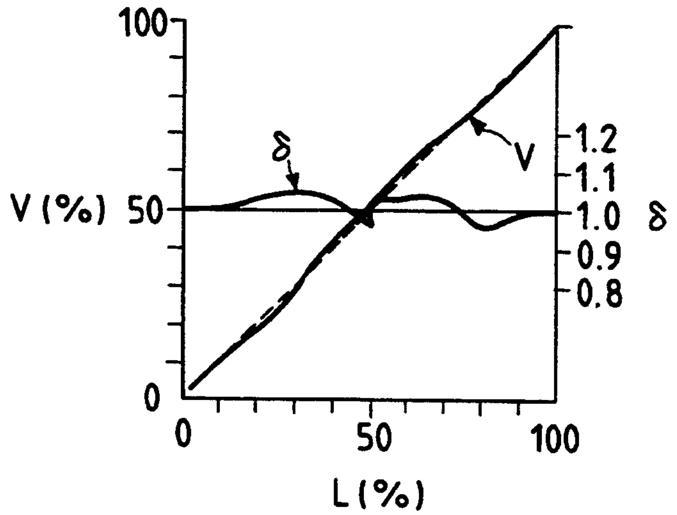
FIG. 4 is a diagram showing a voltage division characteristic of the arrester for a gas insulated switchgear device as shown in FIG. 1.

FIG. 4 shows a voltage dividing characteristic of the arrester for a gas insulated switchgear device as shown in FIG. 1 wherein V in the ordinate indicates potential from the grounding side terminal 10 to the high voltage side terminal 5, δ in the ordinate indicates the voltage division rate and L in the abscissa indicates position from the grounding side terminal 10 to the high voltage side terminal 5 and further in the present instance the intermediate electrode 7 is positioned at ½ the height of the columnar piled body 1. Assuming that when an intermediate voltage division rate δ is 1.0 a completely uniform voltage division is achieved, a voltage division rate δ of about 1.05 is realized according to the present embodiment as seen from FIG. 4 and further, the potential distribution V is brought close to an ideal dotted straight line.

Figure 5:
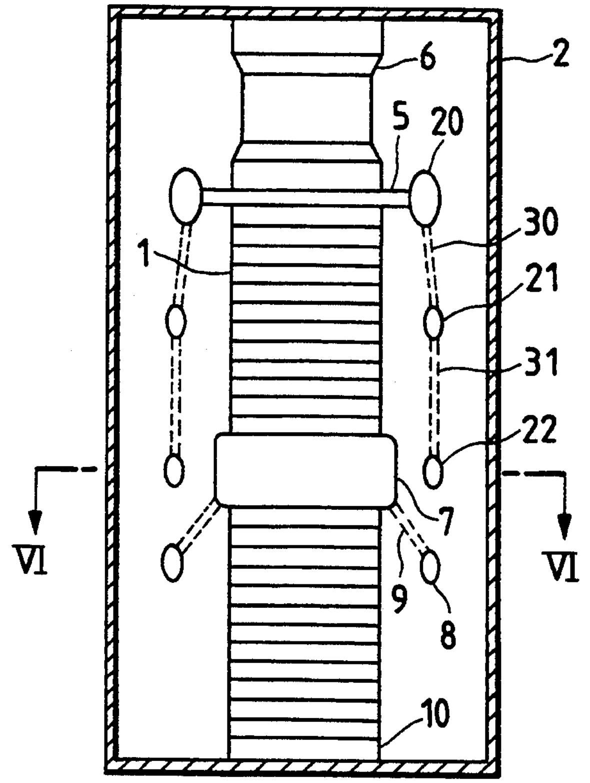
FIG. 5 is a vertical cross sectional view of another embodiment of an arrester for a gas insulated switchgear device according to the present invention.
Figure 6:
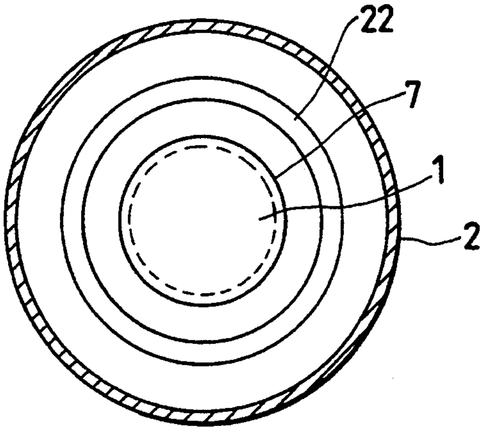
FIG. 6 is a cross sectional view taken along the line VI—VI in FIG. 5.

FIG. 5 is a vertical cross sectional view of another embodiment of an arrester for a gas insulated switchgear device according to the present invention, and FIG. 6 is a cross sectional view taken along VI—VI in FIG. 5. The difference of the present embodiment from the previous embodiment only resides in the constitution of the columnar piled body 1 and the other parts are substantially identical as the previous embodiment. Therefore, the explanation thereof is omitted by assigning the identical reference numerals to the equivalent members and elements.

The columnar piled body 1 is constituted by piling up a plurality of zinc oxide resistance elements along a single axial line as seen, in particular, from FIG. 6, and the intermediate electrode 7 is disposed so as to surround the portion corresponding to the intermediate portion on the axial line. Further, the intermediate portion of the columnar piled body 1 is connected to the intermediate electrode 7 to provide the same potential thereto.

A plurality of the potential equalizing rings 20, 21 and 22 connected to the high voltage side terminal 5 and disposed in its piling up direction in a discrete manner so as to surround the columnar piled body 1 are similarly provided, and the intermediate electrode 7 is placed so as to face the potential equalizing ring 22 located nearest to the grounding side. Further, the distance between the respective potential equalizing rings 20, 21 and 22 is selected, like the previous embodiment, in such a manner that equipotential lines pass respectively between the potential equalizing rings 20, 21 and 22 and connect continuously to the corresponding equipotential planes on the columnar piled body 1. Still further, the potential equalizing ring 8 surrounding the outer circumference of the columnar piled body 1 below the intermediate electrode 7 is connected electrically and mechanically to the intermediate electrode 7 via the conductor 9. The distance between the potential equalizing ring 8 and the intermediate electrode 7 is selected to be like the previous embodiment in such a manner that equipotential lines pass therebetween. Further, these equipotential lines connect containously to the corresponding equipotential planes on the columnar piled body 1.

Even in the present embodiment using a single columnar piled body 1, substantially the same advantages as in the previous embodiment are obtained by arranging the respective potential equalizing rings 20, 21 and 22, the intermediate electrode 7 and the potential equalizing ring 8 in the same manner as in the previous embodiment. As will be apparent from foregoing the embodiments, the idea of the present invention can be applied to an arrester for a gas insulated switchgear device in which the columnar piled body 1 is constituted by piling up a plurality of zinc oxide resistance elements along at least a single axial line. Moreover, the idea of the present invention is also applicable to an arrester for a gas insulated switchgear device wherein the columnar piled body 1 is constituted by electrically serially connecting a plurality of zinc oxide resistance elements piled up along a single axial line or by electrically serially connecting with a plurality of zinc oxide resistance elements piled up along an adjacent axial line.

Figure 7:
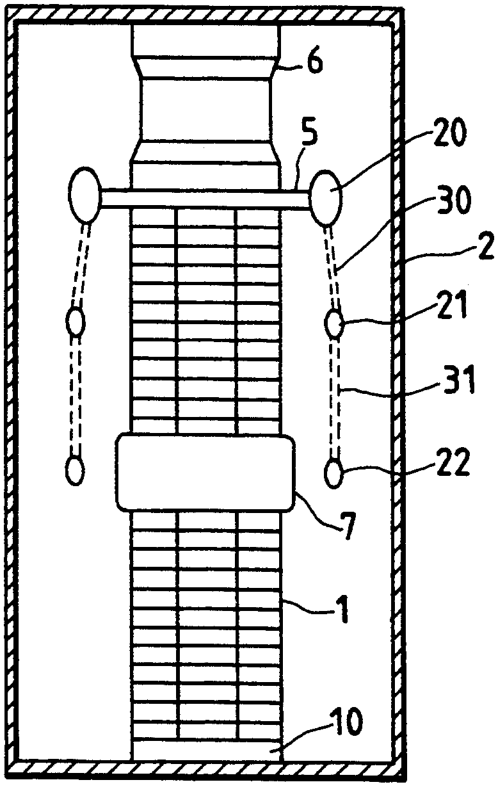
FIG. 7 is a vertical cross sectional view of still another embodiment of an arrester for a gas insulated switchgear device according to the present invention.

FIG. 7 is a vertical cross sectional view of still another embodiment of an arrester for a gas insulated switchgear device according to the present invention. The difference of the present embodiment from the previous embodiments is that the potential equalizing ring 8 electrically and mechanically connected to the intermediate electrode 7 is omitted, and the other parts are substantially identical with the previous embodiments. Therefore, explanation thereof is omitted by assigning the identical reference numerals to the equivalent members and elements.

A plurality of potential equalizing rings 20, 21 and 22, which are arranged in the piling up direction of the respective zinc oxide resistance elements for the columnar piled body 1 with a predetermined spacing distance in a discrete manner so as to surround the outer circumference of the columnar piled body 1, are similarly provided and, further, the intermediate electrode 7 is also provided in a portion of the columnar piled body 1 corresponding to the potential equalizing ring 22 located nearest to the grounding side among the three rings. However, no potential equalizing ring is supported and secured to the intermediate electrode 7, but all of the potential equalizing rings 20, 21 and 22 are supported to the high voltage side terminal 5 via the conductors 30 and 31.

Even with the above constitution according to the present embodiment, when the cross sectional shape, size and location of the respective potential equalizing rings, the distance between the intermediate electrode 7 and the potential equalizing ring 22, and the width of the intermediate electrode 7 in the piling up direction are properly selected, the applied voltage division rate on the respective zinc oxide resistance elements for the columnar piled body 1 is made uniform through the entire piling direction in comparison with the conventional piled body.

Figure 8:
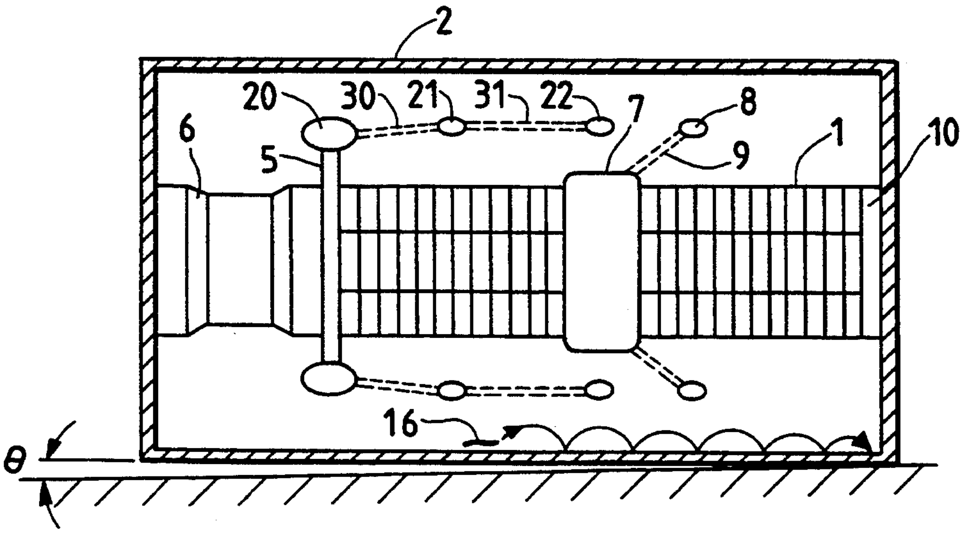
FIG. 8 is a vertical cross sectional view of a further embodiment of an arrester for a gas insulated switchgear device acording to the present invention.

FIG. 8 is a vertical cross sectional view of a further embodiment of an arrester for a gas insulated switchgear device according to the present invention.

The constitution inside the closed container 2 is identical to that shown in FIG. 1, but the closed container 2 is laid down to constitute a later type arrester for a gas insulated switchgear device. Further, the closed container 2 is not disposed exactly horizontally but is slightly inclined by an angle $\theta$ in such a manner that the high voltage side terminal 5 is positioned slightly higher than the grounding side terminal 10 as illustrated in FIG. 8. Since the constitution inside the closed container 2 is substantially identical to that of the arrester shown in FIG. 1, an applied voltage division rate on the respective zinc oxide resistance elements of the columnar piled body 1 is substantially uniform throughout the entire piling up direction.

Further, with the present embodiment, an effective trapping of an electrically conductive foreign material is possible. Namely, when an electrically conductive foreign material 16 erroneously enters into the closed container 2 and is forced to move by an electric field in the closed container 2, the electrically conductive foreign material is finally collected at the grounding side terminal 10 due to the inclination angle $\theta$ provided to the container 2, and further, since the electric field strength around the grounding side terminal 5 is lower than that of the other portions, the electrically conductive foreign material 16, having reached this position never moves to another portion having a high electric field strength. Still further, when a recess portion and the like are formed at the bottom portion of the grounding side terminal 10 in the closed container 2, the trapping of the electrically conductive foreign material 16 is further improved.

In the above respective embodiments, the potential of a zinc oxide resistance element located at the intermediate portion of the columnar piled body 1 is forcedly provided to the intermediate electrode 7. However a zinc oxide resistance element located at a predetermined position can be connected via a capacitance to the intermediate electrode 7 to provide a predetermined potential thereto. In this instance the predetermined zinc oxide resistance element can be connected via a stray capacitance or an actual capacitor with the intermediate electrode 7. Further, when one of the plurality of columnar piled body units 1*a* through 1*d* is electrically connected to the intermediate electrode 7, uniformity of the current division rate between the plurality of columnar piled body units 1*a* through 1*d* is improved. Still further, the position of the intermediate electrode 7 can be changed to any position along the axial direction of the columnar piled body 1 in association with the position of the potential equalizing ring 22. Moreover, for example, second and third intermediate electrodes each facing the potential equalizing rings 8 and 21 can be provided.

Still further, in the above respective embodiments, the respective potential equalizing rings 8, 20, 21 and 22 are formed in a circumferentially continuous ring shape, but they can be divided in the circumferential direction if the same function as the circumferentially continuous ring is performed with regard to the electrical field controlling effect, and further, when the cross section of the potential equalizing ring is shaped like the letter C, the production thereof is facilitated and the production cost thereof is reduced.

According to the present invention as explained hitherto, since the plurality of potential equalizing rings are arranged in a discrete manner along the axial direction of the columnar piled body and the intermediate electrode is disposed around the columnar piled body at a location facing the potential equalizing ring nearest to the grounding side among the potential equalizing rings, an electric field concentration at the lower part of the potential equalizing ring located nearest to the grounding side is relaxed by the intermediate electrode, and thereby an arrester for a gas insulated switchgear device results, of which the applied voltage division rate on the respective zinc oxide resistance elements forming the columnar piled body is made uniform throughout its entire piling up direction.

We claim:

1. An arrester for a gas insulated switchgear device comprising:

- a closed container filled with an insulating gas;
- a columnar piled body disposed in said closed container and formed by piling a plurality of zinc oxide resistance elements along a pile axis between a high voltage side terminal and a grounding side terminal of the columnar piled body;
- a plurality of potential equalizing rings electrically and mechanically connected to the high voltage side terminal of said columnar piled body, said potential equalizing rings being disposed in a discrete manner along the pile axis of the zinc oxide resistance elements with a predetermined spacing distance from each other while surrounding an outer circumference of said columnar piled body; and an intermediate electrode disposed around said columnar piled body between the grounding side terminal and the potential equalizing ring that is located nearest to the grounding side terminal.

2. An arrester for a gas insulated switchgear device according to claim 1, wherein the width of said intermediate electrode measured in the direction of the pile axis is selected to be larger than that of the potential equalizing ring that is nearest thereto.

3. An arrester for a gas insulated switchgear device according to claim 1, further comprising:

a further potential equalizing ring disposed between the grounding side terminal and said intermediate electrode, and surrounding the outer circumference of said columnar piled body, wherein the positional relationship between said further potential equalizing ring and said intermediate electrode is determined in such a manner that equipotential lines pass therebetween and connect continuously to corresponding equipotential planes on said columnar piled body.

4. An arrester for a gas insulated switchgear device according to claim 1, wherein said zinc oxide resistance elements are divided into at least two groups in the pile axis direction, adjacent divided parts of said columnar piled body are spaced from each other and electrically connected via a connecting member arranged therebetween, and said intermediate electrode is disposed so as to surround a connection portion constituted by the connecting member.

5. An arrester for a gas insulated switchgear device according to claim 1, wherein said intermediate electrode is electrically connected to the zinc oxide resistance element facing to said intermediate electrode.

6. An arrester of a gas insulated switchgear device according to claim 5, wherein said intermediate electrode is electrically connected to the facing zinc oxide resistance element via a capacitor.

7. An arrester for a gas insulated switchgear device according to claim 5, wherein said columnar piled body is composed of a plurality of columnar piled body units connected in parallel and said intermediate electrode is electrically connected to a zinc oxide resistance element of one of the plurality of columnar piled body units.

8. An arrester for a gas insulated switchgear device according to claim 1, wherein said closed container is disposed laterally in such a manner that the high voltage side terminal is positioned higher than the grounding side terminal.

* * * * *